United States Patent [19]
Jones et al.

[11] Patent Number: 5,103,852
[45] Date of Patent: Apr. 14, 1992

[54] SAFETY SYSTEM FOR PRESSURIZED TRANSFER INSTALLATIONS

[76] Inventors: James S. Jones, 45 Crown Pl., Richardson, Tex. 75080; David P. Ward, Continental LP Products Co., Inc., Box 225323, Dallas, Tex. 75265

[21] Appl. No.: 638,502

[22] Filed: Jan. 7, 1991

[51] Int. Cl.⁵ .............................................. F16K 17/40
[52] U.S. Cl. ..................................... 137/71; 251/294
[58] Field of Search .................. 251/294; 137/68.1, 71

[56] References Cited

U.S. PATENT DOCUMENTS

| | | | |
|---|---|---|---|
| 2,733,042 | 1/1956 | Culbertson | 251/294 X |
| 3,165,236 | 1/1965 | Beazer et al. | 251/294 X |
| 3,596,875 | 8/1971 | Couper et al. | 251/294 |
| 3,794,057 | 2/1974 | Badger | 137/68.1 |
| 3,916,929 | 11/1975 | Brown | 137/68.1 |
| 4,047,587 | 9/1977 | Anstey | 251/294 X |
| 4,099,551 | 7/1978 | Billington et al. | 251/294 X |
| 4,131,142 | 12/1978 | Barr et al. | 137/68.1 X |
| 4,310,012 | 1/1982 | Billington et al. | 251/294 X |
| 4,617,975 | 10/1986 | Rabushka et al. | 137/68.1 X |
| 4,899,792 | 2/1990 | Podgers | 137/68.1 X |

OTHER PUBLICATIONS

Pioneer, *The Farmer's Choice, 4500 Coupler* promotional sheet.
Fisher, *Emergency Shutoff Valves, Snappy Joe ® Emergency Shutoff Valves for Bulk Plants*, promotional sheet.
RegO, *LP-Gas Emergency Shut-Off Valves (ESV's)* promotional sheet.
RegO, *Pull Away Valves for Transfer Operations*, promotional sheet.

*Primary Examiner*—John Rivell
*Attorney, Agent, or Firm*—Daniel V. Thompson

[57] ABSTRACT

A safety system for a pressurized transfer installation having piping between a storage tank and a flexible transfer hose, includes a shut off valve located in the piping, the shut off valve having selectable closed and open positions, and a cable for mechanically shifting the shut off valve to the closed position, the cable extending to a position remote from the flexible transfer hose.

7 Claims, 8 Drawing Sheets

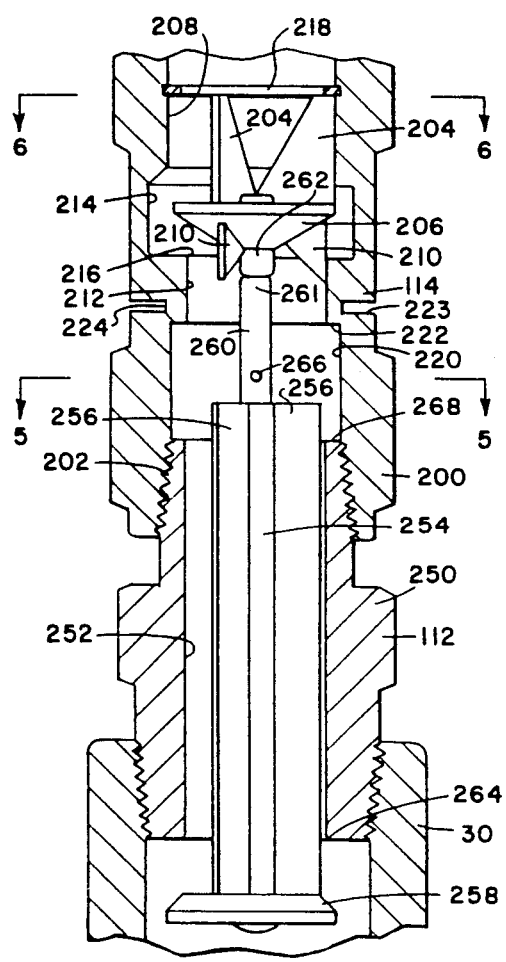
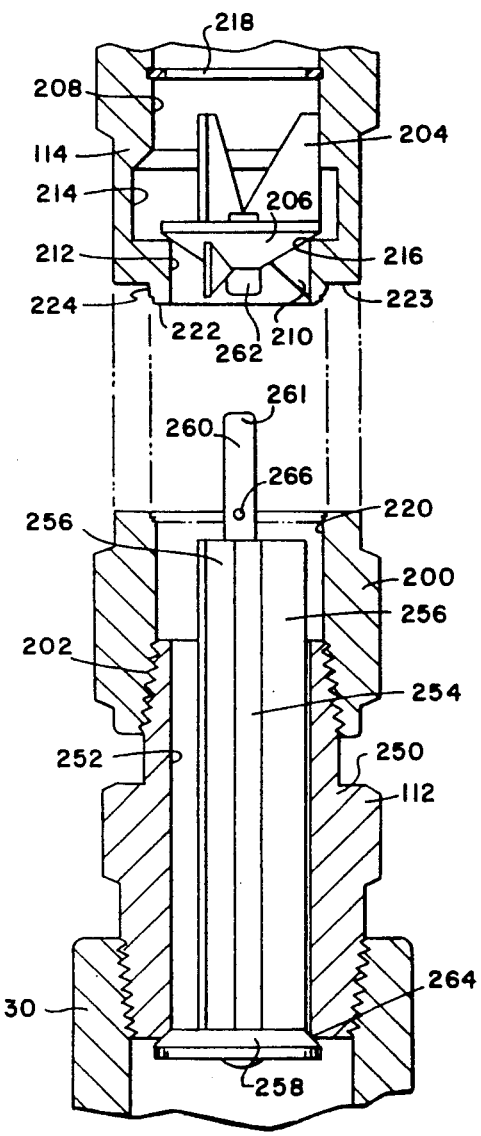
FIG. 4A
FIG. 4B
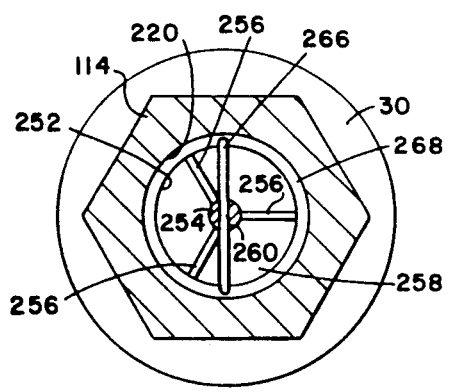
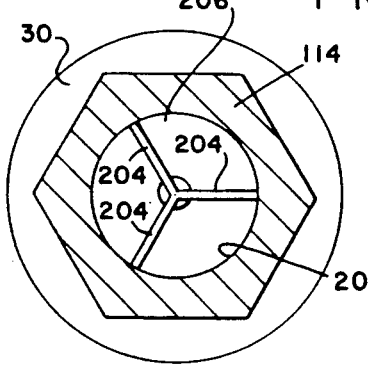
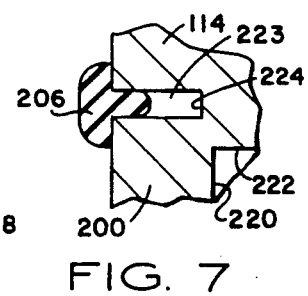
FIG. 5
FIG. 6
FIG. 7

SAFETY SYSTEM FOR PRESSURIZED TRANSFER INSTALLATIONS

FIELD OF INVENTION

This invention relates to stationary pressurized systems used in the transfer of product, through hoses, to pressure vessels mounted on vehicles that could be moved accidentally with the transfer hoses still attached, which could cause severe damage to the stationary system resulting in undesirable product loss. More particularly, the invention relates to equipment used in the transfer of agricultural ammonia from large storage tanks to wagon-mounted nurse tanks, and provides a safety system for ammonia nurse tank loading islands.

BACKGROUND ART

Liquid anhydrous ammonia (NH,) has long been used as a fertilizer for corn, grains and other crops. When originally built, ammonia storage plants were typically located outside of rural towns, on rail sidings when possible. Now many of these towns have grown out to these plants, greatly increasing the potential exposure of town people to ill effects of ammonia in the event of a mishap at the plant.

The market for agricultural ammonia for a given ammonia storage facility is typically within only a 15-mile radius of the facility. The entire market area for any one facility thus becomes ready to receive ammonia at approximately the same time. The influence of weather greatly determines the length of the ammonia market season, but the season is typically crowded into only three months out of a year.

An empty nurse tank coming in from the field is first weighed, then filled, and then weighed again on its way back to the field. This operation typically requires a minimum of 20 minutes, and a typical 20-mile round trip would require another 25-30 minutes. A big tool bar in the corn country in good soil will apply close to a wagon of ammonia an hour. This leaves little time for the hauler between runs.

These conditions do not lend themselves to a well organized and safe operation.

There are three basic filling systems currently in use. The simplest system is a large high volume, high pressure pump vapor return connection to the storage tank. An intermediate system, in terms of complexity, is a pump with a vapor connection from the nurse tank to the storage tank. The third and most complex system currently used is a vapor transfer system, where an ammonia compressor transfers vapor from the nurse tank to the storage to move liquid through a separate line to the nurse tank.

When a nurse tank is pulled to a loading island, the operator chocks one wheel of the wagon, removes dust caps from nurse tank valves, connects filler hoses, opens them, opens tank valves, starts the pump or the compressor, and then opens a fixed level vent which gauges the proper filling level. Once the nurse tank is properly filled, the operator closes the hose end valves, closes the fixed level valve, closes the tank valves, vents the product (vapor) that remains between the tank valve and the hose end valve, which assures the pressure-tightness of the hose end and the tank valve, then he removes the hoses from the nurse tank valves, replaces the dust caps, and then removes the chock from the wagon wheel. The nurse tank is then ready to be weighed.

A recently-enacted safety requirement (CGA-G2.1 and ANSI-K61-1-5.10.8.1) provides that all stationary ammonia storage installations shall have an approved emergency shut off valve installed in the fixed piping of the transfer system within five lineal feet of where the hose or swivel piping is attached to the fixed piping. The emergency shut off valve shall be installed in the facility piping so that any break will occur on the side of the hose or swivel connection. The requirement also states that an approved emergency shut off valve shall incorporate a manually activated shut off from a remote location and a manually activated shut off at the installed location.

This new safety requirement reflects the fact that all too often a vehicle with a nurse tank in tow drives away from a loading island with the liquid ammonia filler hose still attached to the nurse tank. A "drive-away" is the most unfortunate mishap that can occur around an ammonia storage facility, with several potential results of varying severities. The least severe result is a break of the nurse tank filler valve just below the acme threads with both the hose line valve and the nurse tank valve closed—the most devastating result: a partial separation of the filler hose or partial separation of the plant piping with all valves open.

Most of the piping systems in use today are not securely anchored at the loading islands and should a "drive away" occur with the hoses connected and with the hose line and tank valves closed, the only separation of the system without product loss would be just below the male acme threads of the nurse tank valves—unfortunately this is not where the majority of separations occur. Because the loading island piping systems are not secure, it is doubtful that a shear point in the system without a solid anchor would remove all of the potential for disaster. The ideal system would have the facilities piping system well anchored at the filling island with the safety valve no more than six inches above the concrete mounting, with a predetermined separation point that would separate instantly and cleanly, and with means to close the system from both ends and the wagon traffic so directed that in the event of a drive away there would be a straight pull on the hoses.

SUMMARY OF THE INVENTION

Our safety system is built around a well-anchored system with at least one "predetermined separation" fitting (PS fitting) in the piping downstream from a specially designed shut off valve. The shut off valve is both remotely actuated by a cable and actuated upon separation of the PS fitting. The PS fitting includes back check valves on each of the two sides of the separation interface. The preferred embodiments of the system include specially designed shut off valves for the liquid and vapor sides of the system, as well as an improved hose end valve.

A prime objective of this system is to protect the main piping system from the pump to the point at which the service hoses are attached from damage and potential gross ammonia leakages caused by "drive aways" and other mishaps. A second objective of this system is to provide a safety system adapted to accommodate all filling systems in use today (the compressor system, the pump compressor system, or the pump system) with a safe economical operation. Another objective is to provide a system that is easily maintained and repaired in the event of an accidental separation.

BRIEF DESCRIPTION OF THE DRAWINGS

A more complete understanding of the invention and its advantages will be apparent from the Detailed Description taken in conjunction with the accompanying Drawings in which:

FIG. 4A is a partially broken away side view of a PS fitting and a liquid-side check valve fitting;

FIG. 4B is a view similar to FIG. 4A illustrating the PS fitting after separation;

FIG. 5 is a sectional view taken along lines 5—5 of FIG. 4A;

FIG. 6 is a sectional view taken along lines 6—6 of FIG. 4A;

FIG. 7 is a partial view illustrating a resilient sealing boot;

DETAILED DESCRIPTION OF THE PREFERRED EMBODIMENTS

I. The Safety System

Figure 1:
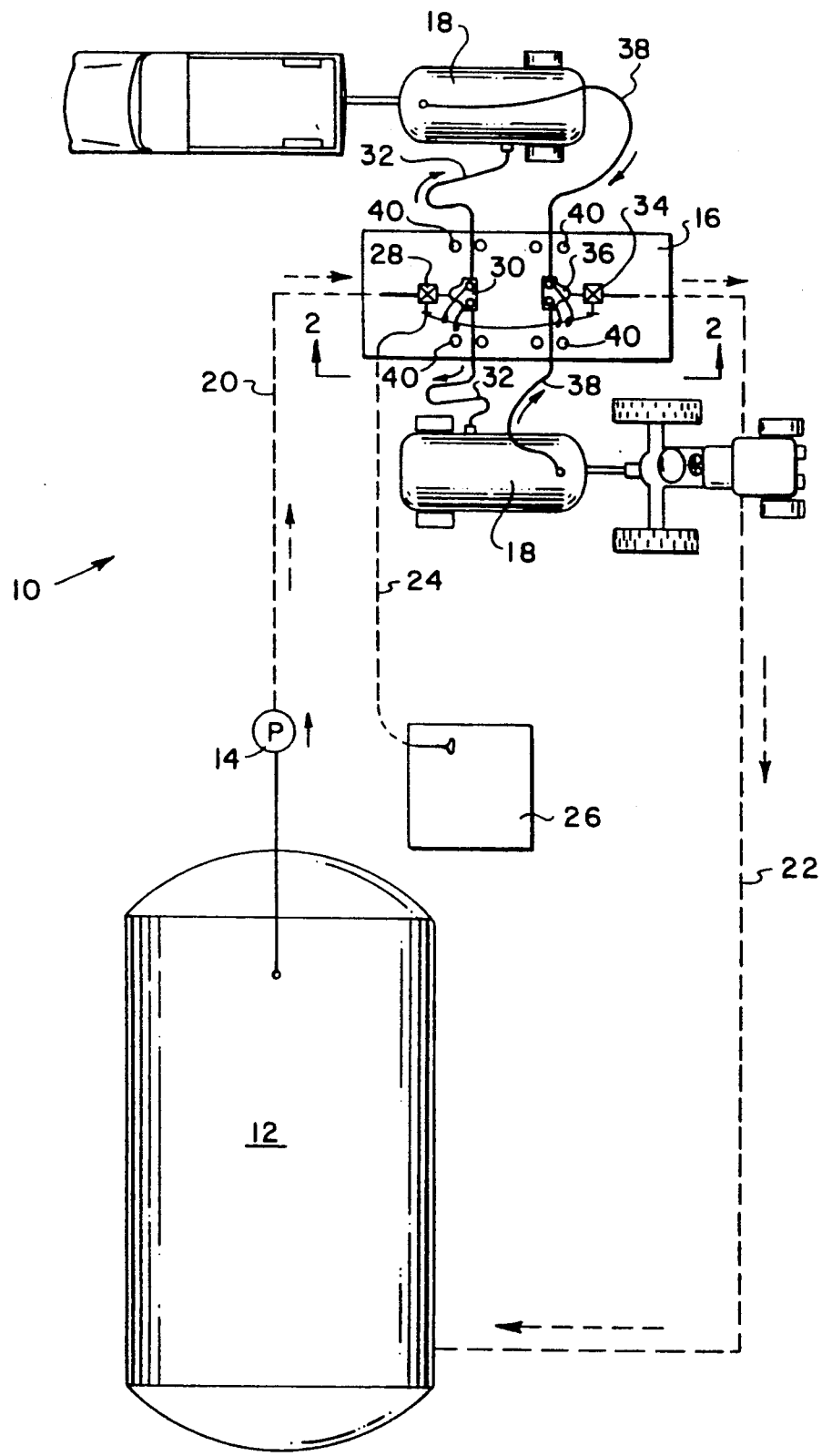
FIG. 1 is a schematic plan view of a storage facility fitted with a safety system constructed in accordance with the invention.

Referring initially to FIG. 1, a safety system is illustrated for use at an anhydrous ammonia transfer installation 10 using a liquid pump with a vapor return system, one of the more complex types of systems currently in use. While the safety system of the present invention is illustrated in this particular environment, those skilled in the art will recognize that the system is readily adaptable to simpler as well as more complex types of ammonia transfer systems. In addition, it will be appreciated that the safety system and its several individual components will be useful in pressurized transfer environments other than ammonia transfer systems.

The installation of FIG. 1 includes a storage tank 12, a liquid pump 14, and a loading island 16. The loading island 16 is adapted to service two nurse tanks/tow vehicles 18 simultaneously, on opposite sides of island 16. Liquid ammonia is supplied from pump 14 to island 16 through underground piping 20. Similarly, a buried vapor return line 22 routes vapor back to tank 12 from island 16. A shut off cable 24 is routed from island 16 to operator station 26. Island 16 includes a liquid-side shut off valve 28, a liquid-side manifold 30 and two liquid hoses 32. Similarly, island 16 includes a vapor-side shut off valve 34, a vapor-side manifold 36 and two vapor hoses 38. Rollers 40 insure a straight pull from the hoses 32 and 38 to the island 16.

Figure 2:
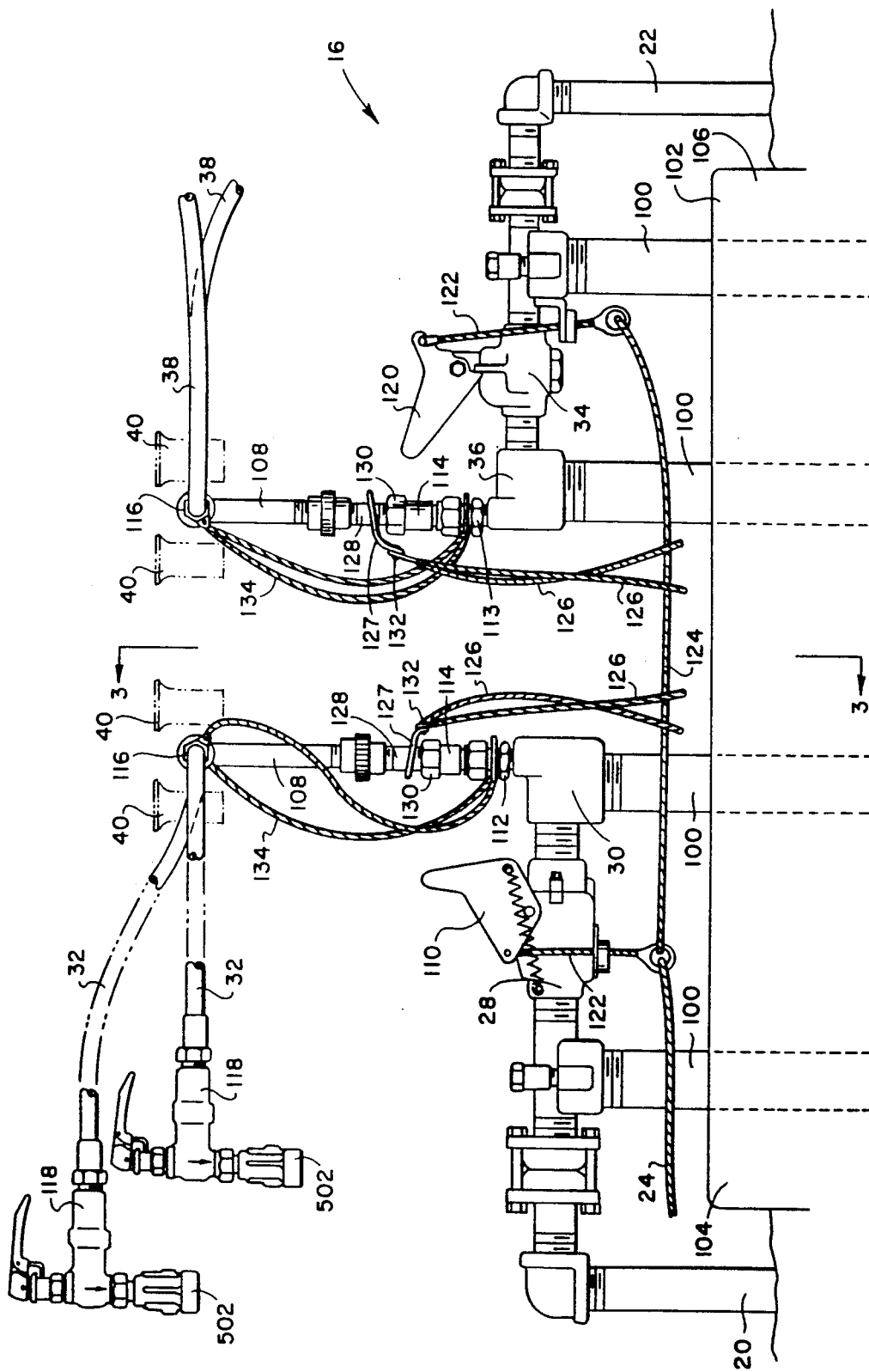
FIG. 2 is a view taken along lines 2—2 of FIG. 1.
Figure 3:
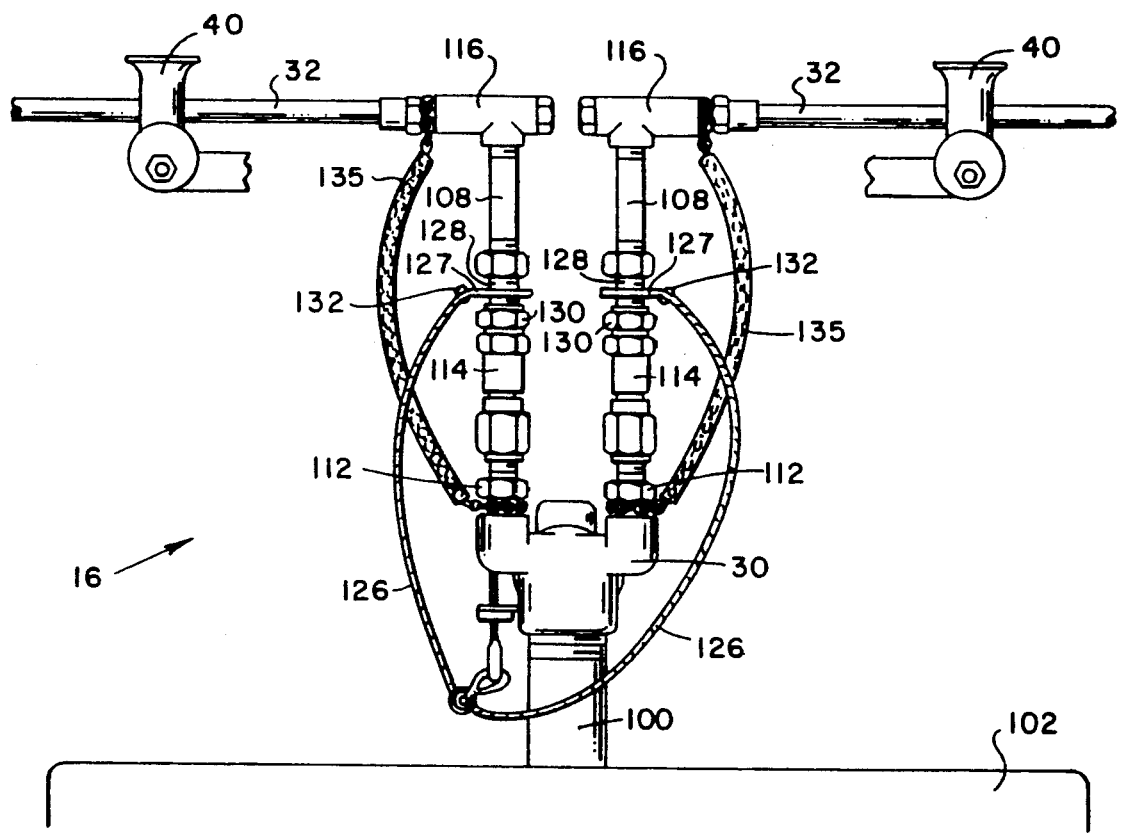
FIG. 3 is a view taken along lines 3—3 of FIG. 2.

Referring now to FIGS. 2 and 3 in addition to FIG. 1, preferably both the liquid and vapor sides of the piping are well mounted on 3" pipes 100 anchored in concrete base 102. The liquid and vapor piping approach one another from opposite ends 104 and 106 of base 102, respectively, at 180 degrees, to form loading island 16 capable of loading two nurse tanks 18 simultaneously. Risers 108 standing vertically are mounted in dual opening manifolds 30 and 36 that are securely mounted on pipes 100. This arrangement provides a liquid and a vapor connection on each side of the island 16 without undue interference between the hoses. To assure a straight pull on a hose in the event of a "drive away", the hoses will be pointed in the direction of the "drive away" by an associated set of rollers 40.

Mounted between the two 3" mounting pipes 100 of the liquid leg is a cam actuated hand opened, hand or remotely closed, swing-type, liquid-side shut off valve 28, described in more detail below in connection with FIGS. 11 and 12. Alternatively, valve 28 may be a normally closed diaphragm valve that is only opened by a pressure increase across the pump. In vapor transfer systems a normally open valve is required. Valve 28 is opened and closed by moving the lever 110 between opened and closed positions.

Mounted in the manifolds 32 and 36 are liquid-side and vapor-side check valve fittings 112 and 113, respectively, that each house a check valve that is normally held open by an opposing check valve mounted in an associated predetermined separation fitting ("PS fitting") 114, allowing a free movement of product in either direction. The valve 116 at the top of each riser 108 is an excess flow valve that may be required by regulation in some areas. Alternatively, a simple elbow may be used. Each hose 32 extends to a quick opening hose end valve 118 that houses a back check valve that prevents a flow from the nurse tanks 18 in the direction of the storage tank 12, as described in more detail below in connection with FIGS. 13 and 14.

The vapor leg is similar to the liquid leg, only preferably smaller, and uses a cam-operated, vapor-side shut off valve 34. Valve 34 is opened and closed by moving the lever 120 between opened and closed positions. Each hose 38 extends to a hose end valve (not shown) like valve 118, except the check valve is reversed and prevents movement of vapor into the nurse tank 18 from the storage tank 12. The PS fittings 114 on the vapor side are identical and interchangeable with the PS fittings 114 on the liquid side. Vapor-side check valve fitting 113 houses a means of keeping the check valve in the open position with a slug check to prevent a movement of vapor from the storage tank 12 to the nurse tank 18.

Should a need arise to shut down the system, cable 24 can be pulled from any direction and shuts the system down by pulling levers 110 and 120 to the closed positions by way of lever cables 122 and drag cable 124 extending therebetween. Separation cables 126 extend upwardly from drag cable 124 to hangers 127 on nipples 128. Nipples 128 are connected to the upper ends 130 of PS fittings 114. Nylon screws 132 connect the separation cables 126 to the hangers 127. Bungie cords 134 (FIG. 2) or equivalent vinyl-jacketed chains 135 (FIG. 3) extend from check valve fittings 112 and 113, below the PS fittings 114, to locations above the PS fittings 114 such as valves 116, as shown.

For example, should a liquid hose 32 rupture during filling, the operator can manually close the system remotely from operator station 26 by pulling cable 24, which will shut down the system from the storage tank 12, and the check valve in hose end valve 118 will stop the flow from the nurse tank 18.

Should a "drive away" occur with both hoses attached and the valves open, upon separation at PS fittings 114, the liquid flow from the storage tank 12 will be stopped by the back check in the liquid-side check valve fitting 112. The liquid from the nurse tank 18 will be stopped by the check valve in liquid-side PS fitting 114. The vapor flow from the storage tank 12 will be stopped by the check valve in vapor-side check valve fitting 113, with the vapor from the nurse tank 18 being stopped by the check valve in vapor-side PS fitting 114.

After separation of PS fittings 114, both the liquid-side shut off valve 28 and the vapor-side shut off valve 34 will be closed by separation cables 126 acting on drag cable 124, which will close both valves 28 and 34 before the nylon screws 132 are sheared, releasing separation cables 126 from hangers 127 attached to risers 128. Bungie cords 134 or chains 135 will break as the hoses collapse in the direction of nurse tank 18, thereby absorbing some of the energy stored in the elongated hoses and slowing the velocities of the severed piping at the ends of the hoses.

In the preferred embodiment, a straight pull of between about 600 to about 1050 pounds on a single hose will cause separation of its associated PS fitting 114, with a total leverage for separation of about 9 inches between the separation point and the valve 116 or equivalent elbow. This distance establishes the force required by the hose to produce a sufficient moment for separation. Typical 12 foot hoses will stretch between 4 and 5 feet when subjected to pulls of these magnitudes. The bungie cord 134 or chain 135 will break with about 350 pounds of pull.

Even after a "drive away", the loading island can be restored to operation in short order by simple replacement of the PS fittings 114, nylon screws 132 and bungie cords 134/chains 135.

II. The Predetermined Separation Fitting ("PS Fitting")

The well-anchored system piping of FIGS. 1-3 will assure the separation point in the event of a "drive away" to be somewhere between the anchor point (base 102) and the section just below the acme threads of the nurse tank 18 valve, which includes the hoses 32 and 38. Unfortunately, a hose is not a desirable separation point due to the possible product loss from the storage side, therefore separation between the anchor and the hose is the preferred location. The separation point must be designed and produced to separate within the safe load range of the hose and a successful operation depends not only in the construction of the PS fitting 114 but also on the mechanical layout of the system on either side of the fitting.

Referring now to FIGS. 4A-7, a PS fitting 114 has body 200 with pipe thread openings on either end with the lower opening 202 to receive liquid-side check valve fitting 112. Three outward legs 204 of outward check valve member 206 fit loosely i cylindrical wall 208 of body 200 forming a proper guide for the outer portion of member 206. Similarly, three inward legs 210 of outward check valve member 206 fit loosely in cylindrical wall 212 of body 200 to guide the inner portion of member 206. Cylindrical wall 212 is of a reduced bore compared to cylindrical wall 208. Cylindrical wall 214 has an enlarged bore compared to walls 208 and 212 to provide the necessary area for product to flow around outward check valve member 206. A shoulder 216 between walls 21 and 214 provides a seating edge for member 206, as best shown in FIG. 4B. A retaining ring 218 prevents member 206 from moving too far outward with product flow.

Cylindrical wall 220 has a flat bottomed bore ending a shoulder 222. This flat bottomed bore is the inside control point for separation; a groove 223 is the outside control point. Preferably, the diameter of the bottom 224 of groove 223 equals the diameter of cylindrical wall 220. The shear section for separation is the material between bottom 224 of groove 223 and shoulder 222. This type of shear is quick and clean and provides a separation point that is well defined as to location and force, as shown in FIG. 4B. Preferably, the thread size in lower opening 202 is unusual, for example, 1⅛" NPT, to prevent reassembly after separation with a system-defeating, work-around repair.

FIG. 7 shows an optional sealing boot 226 of resilient material that prevents the accumulation of water in groove 223 that could freeze and refreeze to produce an untimely separation.

The liquid-side check valve fitting 112 has a body 250 having cylindrical wall 252 forming a straight bore. An extruded guide 254 has three legs 256 that are guide loosely by wall 252. Slug check valve member 258 is securely mounted at the bottom of guide 254. The upper portion of guide 254 has a straight turned section 260 that extends upward to an upper end 261 and contacts the nose 262 of outward check valve member 206. At maximum flow conditions, the contact between upper end 261 and nose 262 prevents slug check valve member 258 from closing against the seat provided by shoulder 264, as shown in FIG. 4A.

At rest, outward check valve member 206 is closed by gravity and slug check valve member 258 is at its maximum open position, as determined by a height-positioning stop pin 266 resting on end 268. As the product flow begins, outward check valve member 206 lifts off its seat and continues to rise until it is stopped by retaining ring 218. As the flow increases, slug check valve member 258 will begin to rise until upper end 261 makes contact with nose 262. This arrangement provides maximum valve capacities.

Should a separation occur at groove 223, outward check valve member 206 would seat, closing the flow from the nurse tank 18, and slug check valve member 258 would close the flow from the storage tank 12.

Referring now to FIGS. 8A-10, the vapor side of the system is identical to the liquid side shown in FIGS. 4A-7 from the PS fitting 114 up. The difference is in the direction of flow, requiring a slight difference in the valving for vapor-side check valve fitting 113.

Figure 8A:
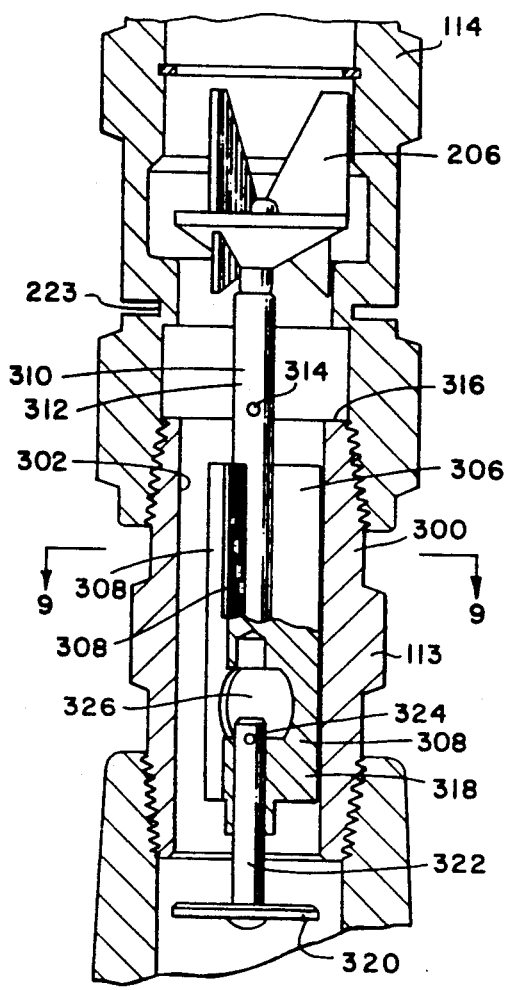
FIG. 8A is a partially broken away side view of a PS fitting and vapor-side check valve fitting.
Figure 8B:
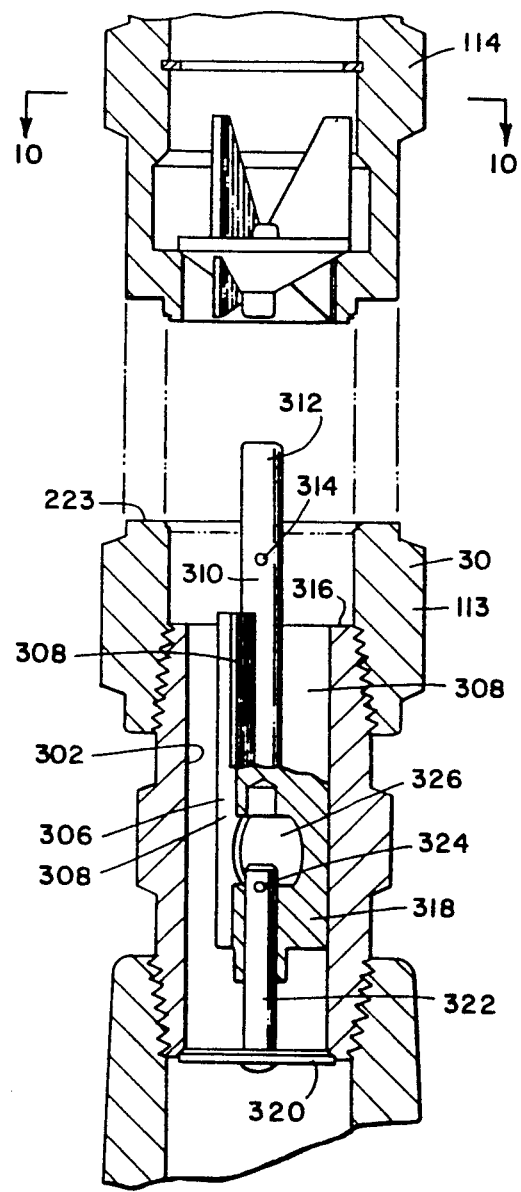
FIG. 8B is a view similar to FIG. 8A illustrating the PS fitting after separation.
Figure 9:
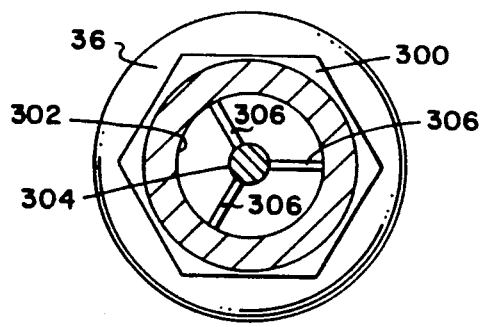
FIG. 9 is a sectional view taken along lines 9—9 of FIG. 8A.
Figure 10:
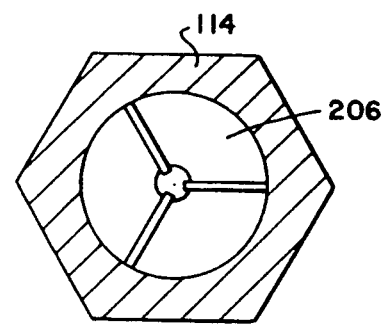
FIG. 10 is a sectional view taken along lines 10—10 of FIG. 8B.

Vapor-side check valve fitting 113 has a body 300 with a straight bore defined by cylindrical wall 302. An extruded guide 306 having three legs 308 extends through and is loosely guided by cylindrical wall 302. At the upper end 310 of guide 306 there is a straight turned section 312 that has a height-positioning stop pin 314 that comes to rest on the top end 316 of body 300 to position outward check valve member 206 at the open position, as shown in FIG. 8A. On the lower end 318 of guide 306 there is an inward check valve member 320 having a shaft 322 that has a retaining pin 324 through it. A machined opening 326 in guide 306 allows inward check valve member 320 to close should there be a reverse flow without a separation of the PS fitting. Should a separation occur at the groove 223, as shown in FIG. 8B, outward check valve member 206 would close, stopping the flow from the nurse tank 18. The reverse flow would close inward check valve member 320, stopping the flow from the storage tank 12. Guide 306 would then drop by gravity relative to member 320 from the position shown in FIG. 8B to its position shown in FIG. 8A.

The only potential mishap left uncovered is a hose separation (full separation or partial separation). Should partial separation occur on the vapor side, inward check valve member 320 would close the storage side, giving a vapor excess flow valve (not shown) in the nurse tank 18 a good chance to close. Should the vapor velocity across the excess flow valve be below the check point of the valve and not close, the nurse tank 18 pressure would fall rather rapidly due to the high latent heat of the product and the situation would become manageable with a minimum loss of product.

The filling rate needs to be a minimum of 75 gpm which typically yields 11 minutes actual filling time, so excess flow check valve 116 on the liquid side would need a minimum capacity of 90 gpm to provide for the higher pressure differences between the storage tank 12 and nurse tank 18 at the start of the fill.

Should a full separation of a liquid hose near the hose end valve occur (which would be unlikely) it is unlikely that an excess flow check valve of 90 gpm would close due to the energy required to whip the hose. The best chance of a shut down, other than the closing of the remote emergency shut down valve, would be a separation at the separation fitting due to the energy of the hose.

The system providing the greatest protection in the more densely populated areas would be a system with a normally closed emergency shut down valve. This system would provide an additional backup—the electrical service to the liquid pump.

III. The Liquid-Side Shut Off Valve

Figure 11:
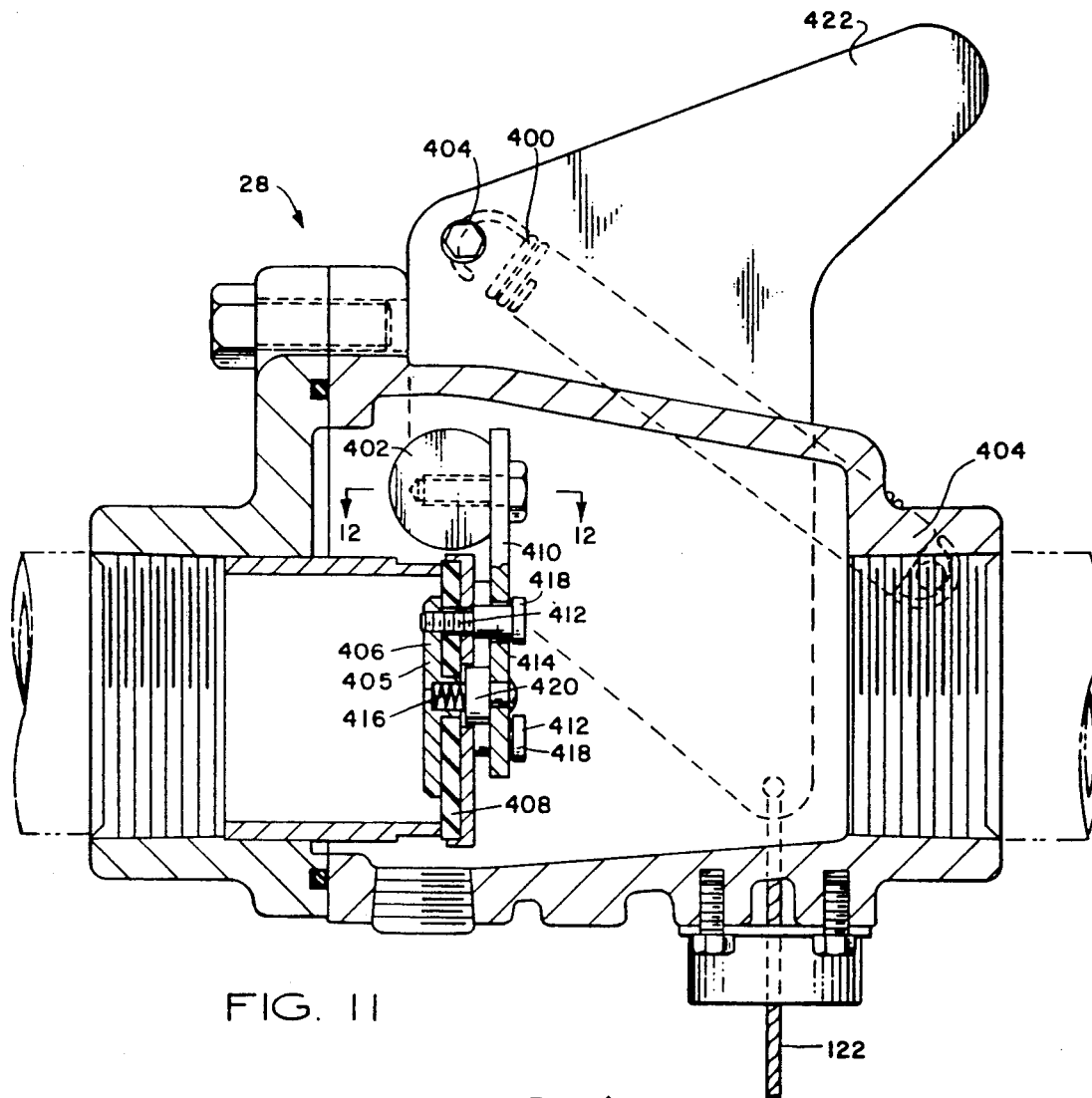
FIG. 11 is a partially broken away side view of a liquid-side shut off valve.
Figure 12:
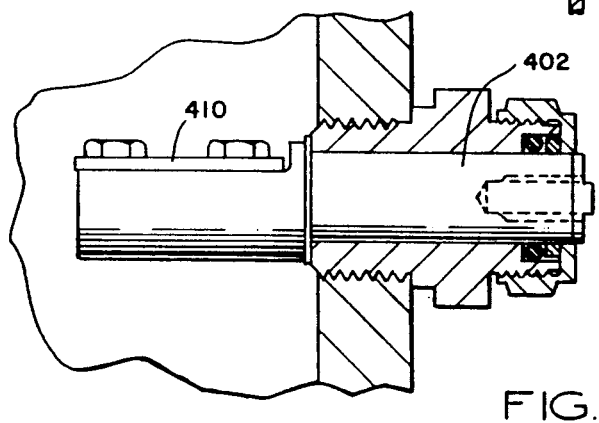
FIG. 12 is a sectional view taken along lines 12—12 of FIG. 11.

Referring now to FIGS. 11 and 12, liquid-side shut off valve 28 provides a remote backup shutdown for the storage side of an ammonia nurse tank 18 filling system, and when used with the predetermined separation system described above it becomes an automatic backup system (cable activated). The position of the closing spring 400 in relation to the swing valve shaft 402 and the two ends 404 of the spring 400 in the open position form a toggle effect eliminating the need of a latch to hold the valve open.

While valve 28 should be bubble tight, its intended function is not impaired with a small leak. The main valve 405 includes cage 406 and seat 408 loosely attached to the swing plate 410, with three screws 412 and spacers 414 to provide the necessary freedom for the valve cage 406 to properly seat. An equalizer valve spring 416 holds the valve cage 406 away from the swing plate 410 and against the heads 418 of the retaining screws 412 to remove unnecessary movement due to product flow to prevent wear. When the valve closes, the main valve 405 seats first then the pressure equalizer valve 420 is closed by the force from the spring 400 which overcomes the equalizer spring 416 to allow the valve to seat. The valve lever 422 and swing plate 410 preferably have a ratio of only 2.6. With a main valve 405 of a size of approximately 2" diameter and a pressure of 150 psig, a lever force of 200 pounds would be required to open the valve, signalling the operator that the system is opened and that pressure across the valve has not equalized. Should the valve be opened, with an opened system, the amount of product lost could be considerable. The pressure equalizer valve 420, in contrast, would require about 15 pounds of force to open against 150 psig. This arrangement allows the rapid pressure equalization of a closed ended system allowing the main valve 405 to be opened easily and also a controlled means of checking the pressure tightness of the system.

The vapor-side shut off valve 34 is a simple lever-operated poppet valve known in the art.

IV. Hose End Valves

Figure 13:
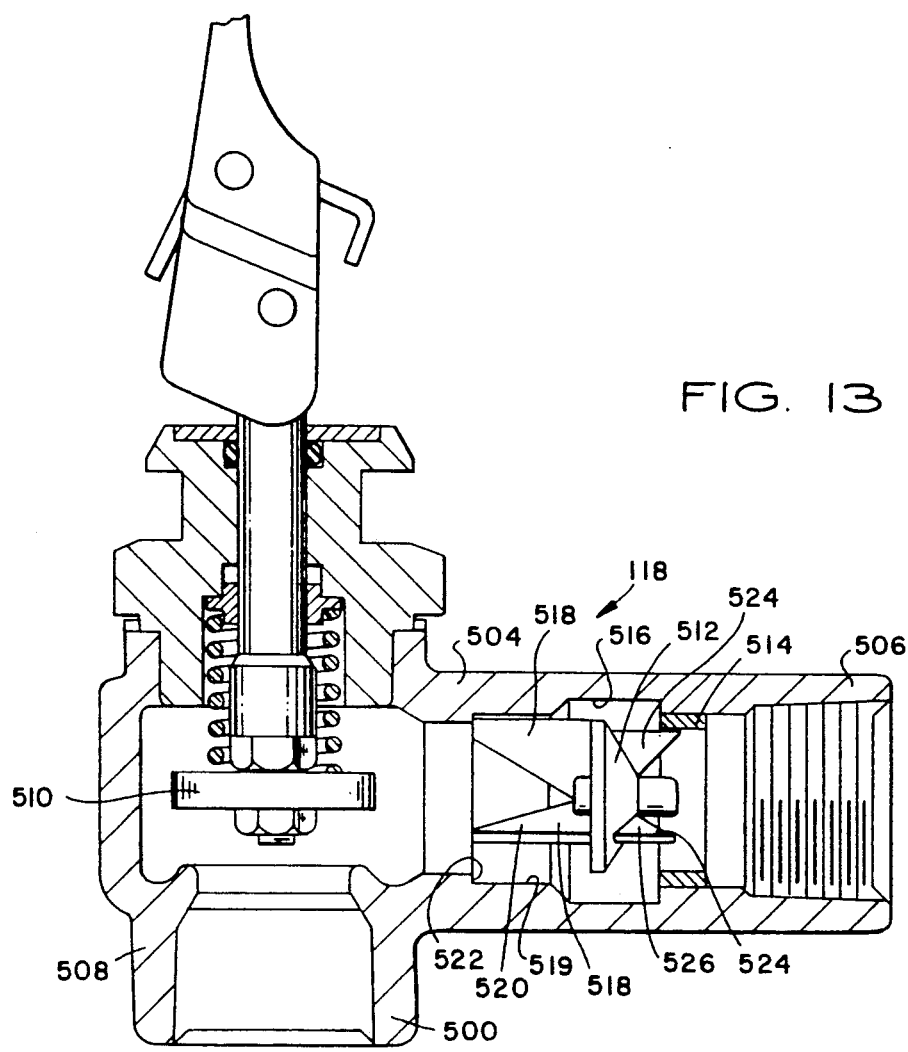
FIG. 13 is a partially broken away side view of a liquid-side hose end valve.
Figure 14:
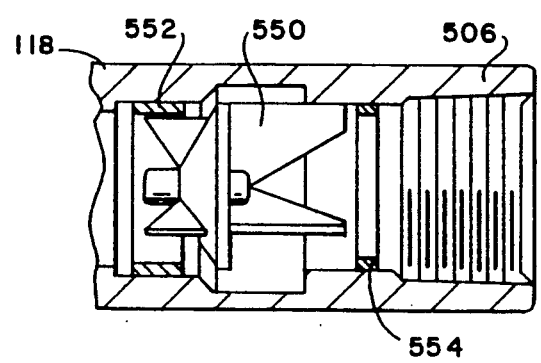
FIG. 14 is a partially broken away side view of a back check valve for a vapor-side hose end valve.

Referring now to FIGS. 13 and 14, the hose end valves 118, both liquid (FIG. 13) and vapor (FIG. 14), are fitted with back check valves. The hose end valves 118 provide the means to isolate the storage tank 12 from the nurse tank 18 before and after filling. The nurse tank 18 valves typically have a male acme thread inlet, a screw type manual filler valve with an excess flow check valve in the tank end of the outlet. The outlet end 500 of the hose end valve 118 has a female acme nut 502 (FIG. 2) that is free to turn to draw two sealing faces together.

The usual filling procedure with the proper connection made is to slowly open the hose end valve 118 to be sure of a proper seal, then fully open the hose end valve 118, and then slowly open the filler valve. Then the operator starts the liquid pump or the vapor transfer compressor, as the case may be. The operator then opens the fixed level vent, and when liquid appears at the vent, the operator closes the hose end valves 118, the fixed level vent, shuts down the pump or compressor, then closes the tank filler valves, and then opens the vent (not shown) of the hose end valve 118 to be sure that both the hose end valve 118 and tank valve are closed and the pressure between the two valves are ambient before disconnecting the valves.

As shown in FIG. 13, hose end valve 118 has a body 504 having an inlet 506, an outlet 508, and a valve 510 to control product flow from inlet 506 to outlet 508. Preferably, valve 510 is a poppet valve as shown. Between the inlet 506 and valve 510, there is a free moving check valve 512 which is contained in body 504 along with seat 514. Cylindrical wall 516 provides an enlarged diameter bore to provide the additional area around the check valve 512 to meet the desired capacity. Check valve 512 ha three legs 518 which loosely fit in cylindrical wall 519, forming a proper guide for the inward end 520. The inward movement of check valve 512 is limited by shoulder 522. Extending into seat 514 are three legs 524 which form a guide for the outward end 526.

During filling, valves 118 are as shown in FIG. 13. Should a hose rupture with valve 118 in the open position, but for check valve 512 in the system the leak could be fed from the nurse tank 18 as well as from the storage tank 12. Should the storage piping be protected with safety shutdown valves, the product from the storage side could be stopped, however, the product leak from the nurse tank 18 would have to be in excess of 40 gallons per minute to close the typical excess flow valve on the nurse tank 18. The use of check valve 512 in the system turns a bad situation into a manageable situation.

FIG. 14 illustrates the inlet 506 of FIG. 13, except check valve 550 is reversed with the seat 552 inward with a retainer 554 outward. The movement of vapor product during filling is from the nurse tank 18 to the storage. Check valve 550 in the vapor side prevents the undesirable pressurizing of the nurse tank 18. Nurse tank 18 returned to the plant with 5-10% product late in the day to be filled the next morning could have a vapor pressure several pounds less than the storage tank 12. A nearly full 30,000 gallon storage with a liquid temperature of 45 degrees would have a vapor pressure of 66 psig while a nearly empty 1,000 gallon nurse tank 18 could have a liquid temperature of 30 degrees and a pressure of 45 psig or a pressure difference of 21 psi, which will reduce the energy required to fill the nurse tank 18.

Thus, check valves 512 and 550 enhance both the safety of the system as well as the function of the system.

V. Alternate Embodiment

Figure 15:
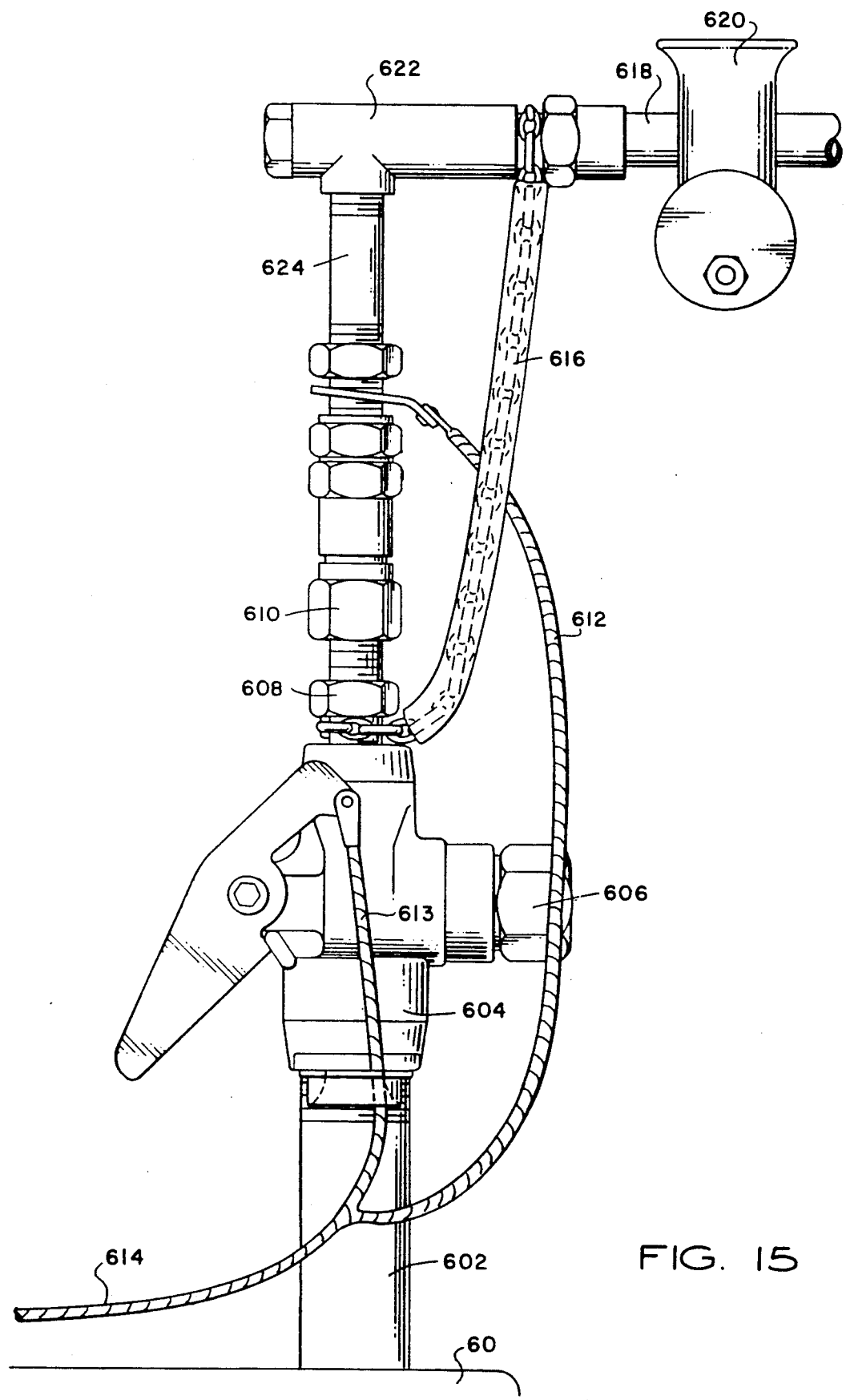
FIG. 15 is a partial elevation view of an alternate embodiment of the invention.

Referring now to FIG. 15, an alternate, simpler embodiment of the invention includes a single port for supplying liquid ammonia to a single nurse tank, without vapor return, yet incorporates numerous features of the present invention. A concrete base 600 supports pipe 602, which pipe supports the valving and piping above it. A cam-operated poppet valve 604 receives liquid ammonia at inlet 606. Check valve fitting 608 and PS fitting 610 are provided as described above in connection with FIGS. 4A-7. Cables 612, 613 and 614 cooperate to provide both a manual shut off as well as a shut off activated by separation of PS fitting 610. Chain 616 is provided to absorb the energy of an elongated hose 618. Hose 618 is guided by roller 620 to ensure a straight pull on valve 622 and riser 624.

Whereas the present invention has been described with respect to specific embodiments thereof, it will be understood that various changes and modifications will be suggested to one skilled in the art, and it is intended to encompass such changes and modifications as fall within the scope of the appended claims.

We claim:

1. A safety system for a pressurized fluid transfer installation having piping between a storage tank and a flexible transfer hose, comprising:

at least one shut off valve located in the piping, the shut off valve having selectable closed and open positions;

at least one cable for mechanically shifting the shut off valve to the closed position, the cable extending to a position remote from the shut off valve;

where the cable is actuated by tensioning the flexible hose, such that tension on the hose above a preselected value shifts the shut off valve to the closed position; and where the cable extends to a separable portion of the piping located between the shut off valve and the flexible hose, the separable portion being separable from the shut off valve by tension on the flexible hose above the preselected value, such that when hose tension causes the separable portion to become separated, the shut off valve is shifted to the closed position.

2. A safety system for a pressurized fluid transfer installation having piping between a storage tank and a flexible transfer hose, comprising:

at least one shut off valve located in the piping, the shut off valve having selectable closed and open positions; and shift means for mechanically shifting the shut off valve to the closed position; and the shift means extending from the shut off valve to a separable portion of the piping located between the shut off valve and the flexible hose, the separable portion being separable from the shut off valve by tension on the flexible hose above the preselected value, such that when hose tension causes the separable portion to become separated, the shut off valve is shifted to the closed position.

3. The safety system of claim 2 including a predetermined separation fitting between the shut off valve and the separable portion, the predetermined separation fitting including a body, with the body having walls defining a predetermined separation point.

4. The safety system of claim 3 wherein the body has cylindrical cross sections, and the walls form a groove in the body to define the predetermined separation point.

5. The safety system of claim 4 wherein the body has an internal cylindrical wall ending at a shoulder, the shoulder located with respect to a bottom wall of the groove to define the predetermined separation point.

6. The safety system of claim 5 wherein the bottom wall of the groove and the shoulder are of substantially the same diameter.

7. The safety system of claim 3 wherein the body contains inward and outward check valves on opposite sides of the predetermined separation point.

* * * * *